United States Patent
Brennan et al.

(10) Patent No.: US 8,601,694 B2
(45) Date of Patent: Dec. 10, 2013

(54) METHOD FOR FORMING AND INSTALLING STRINGERS

(75) Inventors: Joseph D. Brennan, Shoreline, WA (US); Darrell D. Jones, Mill Creek, WA (US); Brian G. Robins, Renton, WA (US)

(73) Assignee: The Boeing Company, Chicago, IL (US)

( * ) Notice: Subject to any disclaimer, the term of this patent is extended or adjusted under 35 U.S.C. 154(b) by 1165 days.

(21) Appl. No.: 12/138,975

(22) Filed: Jun. 13, 2008

(65) Prior Publication Data

US 2009/0320292 A1   Dec. 31, 2009

(51) Int. Cl.
   *B21D 53/88*   (2006.01)
(52) U.S. Cl.
   USPC ........................................................ 29/897.2
(58) Field of Classification Search
   USPC ........................................................ 29/897.2
   See application file for complete search history.

(56) References Cited

U.S. PATENT DOCUMENTS

| | | | |
|---|---|---|---|
| 1,433,879 A | 10/1922 | Fancher et al. |
| 1,504,547 A | 8/1924 | Egerton |
| 1,965,716 A | 7/1934 | Thorns et al. |
| 2,750,629 A | 6/1956 | Baudou |
| 2,981,976 A | 5/1961 | Maier |
| 3,376,184 A | 4/1968 | Ritchey et al. |
| 3,526,558 A | 9/1970 | Beeson |
| 3,693,924 A | 9/1972 | Blatherwick |
| 3,843,756 A | 10/1974 | Talbott et al. |
| 3,975,363 A | 8/1976 | Jones |
| 3,990,291 A | 11/1976 | Evertz et al. |
| 4,132,755 A | 1/1979 | Johnson |
| 4,254,735 A | 3/1981 | Postupack et al. |
| 4,270,964 A | 6/1981 | Flaskett |
| 4,338,070 A | 7/1982 | Nava |
| 4,366,698 A | 1/1983 | Gill |
| 4,367,644 A | 1/1983 | Kramer et al. |
| 4,411,148 A | 10/1983 | Aschauer et al. |
| 4,416,170 A | 11/1983 | Gibson et al. |
| 4,443,401 A | 4/1984 | Turner |
| 4,475,976 A | 10/1984 | Mittelstadt et al. |
| 4,504,341 A | 3/1985 | Radzwill et al. |
| 4,614,558 A | 9/1986 | Kobe |
| 4,657,717 A | 4/1987 | Cattanach et al. |

(Continued)

FOREIGN PATENT DOCUMENTS

| | | |
|---|---|---|
| CA | 2487697 A1 | 5/2006 |
| DE | 742682 C | 12/1943 |

(Continued)

OTHER PUBLICATIONS

P106603EP00, Oct. 18, 2011, The Boeing Company.

(Continued)

*Primary Examiner* — David Bryant
*Assistant Examiner* — Moshe Wilensky
(74) *Attorney, Agent, or Firm* — Yee & Associates, P.C.

(57) ABSTRACT

A hands-free method and related apparatus are used to shape, place and compact a composite stringer on a composite skin of an aircraft. A composite charge is placed on a tool assembly that used to shape the charge into a preformed stringer. With the stringer held on the tool assembly, the tool assembly is used to move the preformed stringer into proximity with the skin and both place and compact the stringer against the skin. Following compaction of the stringer, the tool assembly is removed and the skin and the stringer are co-cured.

15 Claims, 10 Drawing Sheets

(56) References Cited

U.S. PATENT DOCUMENTS

| | | | |
|---|---|---|---|
| 4,726,924 A | 2/1988 | Mittelstadt | |
| 4,780,262 A | 10/1988 | Von Volkli | |
| 4,902,215 A | 2/1990 | Seemann, III | |
| 4,922,232 A | 5/1990 | Bosich | |
| 4,933,232 A | 6/1990 | Trout et al. | |
| 4,946,526 A | 8/1990 | Petty-Galis et al. | |
| 4,961,700 A | 10/1990 | Dunbar | |
| 5,022,248 A | 6/1991 | Brooks et al. | |
| 5,040,962 A | 8/1991 | Waszeciak et al. | |
| 5,060,501 A | 10/1991 | Heath | |
| 5,087,193 A | 2/1992 | Herbert, Jr. | |
| 5,108,532 A | 4/1992 | Thein et al. | |
| 5,129,813 A | 7/1992 | Shepherd | |
| 5,152,949 A | 10/1992 | Leoni et al. | |
| 5,178,812 A | 1/1993 | Sanford et al. | |
| 5,188,787 A | 2/1993 | King et al. | |
| 5,286,438 A | 2/1994 | Dublinski et al. | |
| 5,292,475 A | 3/1994 | Mead et al. | |
| 5,304,057 A | 4/1994 | Celerier et al. | |
| 5,327,764 A | 7/1994 | Weykamp et al. | |
| 5,366,431 A | 11/1994 | Smith et al. | |
| 5,366,684 A | 11/1994 | Corneau, Jr. | |
| 5,464,337 A | 11/1995 | Bernardon et al. | |
| 5,582,058 A | 12/1996 | Knudson | |
| 5,683,648 A | 11/1997 | Fortin | |
| 5,690,973 A | 11/1997 | Kindt-Larsen et al. | |
| 5,707,576 A | 1/1998 | Asher | |
| 5,714,179 A | 2/1998 | Goodridge et al. | |
| 5,772,950 A | 6/1998 | Brustad et al. | |
| 5,824,255 A | 10/1998 | Ross et al. | |
| 5,830,305 A | 11/1998 | Andersen et al. | |
| 5,846,464 A | 12/1998 | Hoffman | |
| 5,882,462 A | 3/1999 | Donecker et al. | |
| 5,939,007 A | 8/1999 | Iszczyszyn et al. | |
| 6,089,061 A | 7/2000 | Haas et al. | |
| 6,139,942 A | 10/2000 | Hartness et al. | |
| 6,159,414 A | 12/2000 | Tunis, III et al. | |
| 6,245,275 B1 | 6/2001 | Holsinger | |
| 6,269,677 B1 | 8/2001 | Torvinen et al. | |
| 6,299,819 B1 | 10/2001 | Han | |
| 6,495,086 B1 | 12/2002 | Uytterhaeghe et al. | |
| 6,511,570 B2 | 1/2003 | Matsui | |
| 6,558,590 B1 | 5/2003 | Stewart | |
| 6,692,681 B1 | 2/2004 | Lunde | |
| 6,723,272 B2 | 4/2004 | Montague et al. | |
| 6,749,784 B2 | 6/2004 | Blanchon | |
| 6,814,916 B2 | 11/2004 | Willden et al. | |
| 6,823,578 B2 | 11/2004 | Anderson et al. | |
| 6,843,953 B2 | 1/2005 | Filsinger et al. | |
| 6,855,284 B2 | 2/2005 | Lanni et al. | |
| 6,862,989 B2 | 3/2005 | Belanger et al. | |
| 6,929,770 B2 | 8/2005 | Caldwell, Jr. | |
| 6,967,000 B2 | 11/2005 | Vaara | |
| 7,021,096 B2 | 4/2006 | Barnett | |
| 7,091,300 B2 | 8/2006 | Lühmann et al. | |
| 7,118,370 B2 | 10/2006 | Willden et al. | |
| 7,126,496 B2 | 10/2006 | Greene | |
| 7,132,161 B2 | 11/2006 | Knowles et al. | |
| 7,141,199 B2 | 11/2006 | Sana et al. | |
| 7,160,498 B2 | 1/2007 | Mataya | |
| 7,306,450 B2 | 12/2007 | Hanson | |
| 7,334,782 B2 | 2/2008 | Woods et al. | |
| 7,429,172 B2 | 9/2008 | Chotard | |
| 7,464,508 B2 | 12/2008 | Fournie et al. | |
| 7,527,759 B2 | 5/2009 | Lee et al. | |
| 7,601,421 B2 | 10/2009 | Khabashesku et al. | |
| 7,622,066 B2 | 11/2009 | Brustad et al. | |
| 7,655,168 B2 | 2/2010 | Jones et al. | |
| 7,708,546 B2 | 5/2010 | Lee et al. | |
| 7,824,171 B2 | 11/2010 | Hanson et al. | |
| 7,951,318 B2 | 5/2011 | Hanson | |
| 7,959,753 B2 | 6/2011 | Nunez Delgado et al. | |
| 8,105,068 B2 | 1/2012 | Ross et al. | |
| 2001/0045684 A1 | 11/2001 | Blanchon | |
| 2002/0167119 A1 | 11/2002 | Hemphill | |
| 2003/0205156 A1 | 11/2003 | Belanger et al. | |
| 2003/0234471 A1 | 12/2003 | Kuroiwa et al. | |
| 2004/0041304 A1 | 3/2004 | Willden et al. | |
| 2004/0043196 A1 | 3/2004 | Willden et al. | |
| 2004/0071870 A1 | 4/2004 | Knowles et al. | |
| 2004/0145080 A1 | 7/2004 | Tanaka | |
| 2004/0145095 A1 | 7/2004 | McCollum et al. | |
| 2004/0219855 A1 | 11/2004 | Tsotsis | |
| 2005/0051932 A1 | 3/2005 | Danzik | |
| 2005/0059309 A1 | 3/2005 | Tsotsis | |
| 2005/0073076 A1 | 4/2005 | Woods et al. | |
| 2005/0086991 A1 | 4/2005 | Barnett | |
| 2005/0142239 A1 | 6/2005 | Frank | |
| 2005/0178083 A1 | 8/2005 | Fournie et al. | |
| 2006/0017200 A1 | 1/2006 | Cundiff et al. | |
| 2006/0068170 A1 | 3/2006 | Hanson | |
| 2006/0071817 A1 | 4/2006 | Greene | |
| 2006/0166003 A1 | 7/2006 | Khabashesku et al. | |
| 2006/0231981 A1 | 10/2006 | Lee et al. | |
| 2007/0175171 A1 | 8/2007 | Delgado et al. | |
| 2007/0176323 A1 | 8/2007 | Jones et al. | |
| 2008/0054523 A1 | 3/2008 | Hanson | |
| 2008/0286564 A1 | 11/2008 | Tsotsis | |
| 2009/0123588 A1 | 5/2009 | Lee et al. | |
| 2010/0068326 A1 | 3/2010 | Jones et al. | |
| 2010/0074979 A1 | 3/2010 | Cundiff et al. | |
| 2010/0102482 A1 | 4/2010 | Jones et al. | |
| 2011/0195230 A1 | 8/2011 | Hanson | |

FOREIGN PATENT DOCUMENTS

| | | |
|---|---|---|
| DE | 4234002 A1 | 4/1994 |
| DE | 19536675 C1 | 2/1997 |
| EP | 0659541 A1 | 6/1995 |
| EP | 1136239 A2 | 9/2001 |
| EP | 1393873 A2 | 3/2004 |
| EP | 1972428 A2 | 9/2008 |
| EP | 2133263 A2 | 12/2009 |
| FR | 2035314 A5 | 12/1970 |
| FR | 2162296 A1 | 12/1971 |
| FR | 2667013 A1 | 3/1992 |
| FR | 2771332 A1 | 5/1999 |
| FR | 2844472 A1 | 3/2004 |
| GB | 2139934 A | 11/1984 |
| JP | 61043562 A | 3/1986 |
| JP | 2001310798 A | 11/2011 |
| WO | 2004025003 A2 | 3/2004 |
| WO | 2005095091 A1 | 10/2005 |
| WO | 2006014825 A1 | 2/2006 |
| WO | 2006039124 A2 | 4/2006 |
| WO | 2006048652 A1 | 5/2006 |
| WO | 2006113048 A2 | 10/2006 |
| WO | 2010047980 A1 | 4/2010 |

OTHER PUBLICATIONS

Ando et al., "Growing Carbon Nanotubes," Materials Today, Oct. 2004, vol. 7, No. 10, pp. 22-29.
Brittles, "New Developments in Resin Transfer Moulding," Proc. 19th International Composites Congress, Nov. 1994, pp. 11-26.
"A Composite Preform," IP.com Prior Art Database Technical Disclosure No. IPCOM000007326D, dated Mar. 14, 2002, http://www.ip.com/IPCOM/000007326, 4 pages.
European Search Report, dated Aug. 5, 2008, regarding Application No. EP08012344 (EP1972428), 6 pages.
Garcia et al., "Hybrid Carbon Nanotube-Composite Architectures," MTL Annual Research Report, Sep. 2006, p. 208.
"Growing Carbon Nanotubes Aligned With Patterns," NASA Tech Briefs No. NPO-30205, Oct. 2002, http://nasatech.com/Briefs/Oct02/NPO30205.html, 2 pages.
International Search Report, dated Dec. 7, 2005, regarding Application No. PCT/US2005/026141 (WO2006014825), 3 pages.
International Search Report, dated May 19, 2006, regarding Application No. PCT/US2005/033279 (WO2006039124), 5 pages.
"The Longest Carbon Nanotubes You Have Ever Seen," http://www.spacemart.com/reports/The_Longest_Carbon_Nanotubes_You_Have_Ever_Seen_999.html, May 14, 2007, 1 page.

(56) References Cited

OTHER PUBLICATIONS

Musch et al., "Tooling With Reinforced Elastomeric Materials," Composites Manufacturing, 1992, vol. 3, No. 2, pp. 101-111.
"The Wondrous World of Carbon Nanotubes," http://students.chem.tue.nl/ifp03/Wondrous%20World%20of%0Carbon%Nanotubes_Final.pdf, Feb. 27, 2003, pp. 1-23.
USPTO Office Action, dated Mar. 22, 2007, regarding U.S. Appl. No. 10/953,670, 19 pages.
USPTO Notice of Allowance, dated Jul. 31, 2007, regarding U.S. Appl. No. 10/953,670, 6 pages.
USPTO Office Action, dated Sep. 3, 2010, regarding U.S. Appl. No. 11/927,003, 14 pages.
USPTO Notice of Allowance, dated Feb. 2, 2011, regarding U.S. Appl. No. 11/927,003, 9 pages.
USPTO Office Action, dated Apr. 4, 2008, regarding U.S. Appl. No. 10/899,660, 21 pages.
USPTO Final Office Action, dated Oct. 16, 2008, regarding U.S. Appl. No. 10/899,660, 17 pages.
USPTO Notice of Allowance, dated Jun. 22, 2009, regarding U.S. Appl. No. 10/899,660, 14 pages.
USPTO Office Action, dated May 11, 2012, regarding U.S. Appl. No. 12/576,759, 18 pages.
USPTO Office Action, dated May 27, 2009, regarding U.S. Appl. No. 12/354,856, 12 pages.
USPTO Notice of Allowance, dated Dec. 23, 2009, regarding U.S. Appl. No. 12/354,856, 8 pages.
USPTO Miscellaneous Communication, dated Mar. 2, 2010, regarding U.S. Appl. No. 12/354,856, 4 pages.
USPTO Office Action, dated Oct. 15, 2008, regarding U.S. Appl. No. 11/344,458, 22 pages.
USPTO Office Action, dated May 6, 2009, regarding U.S. Appl. No. 11/344,458, 6 pages.
USPTO Notice of Allowance, dated Sep. 28, 2009, regarding U.S. Appl. No. 11/344,458, 7 pages.
USPTO Supplemental Notice of Allowance, dated Oct. 30, 2009, regarding U.S. Appl. No. 11/344,458, 4 pages.
USPTO Supplemental Notice of Allowance, dated Nov. 12, 2009, regarding U.S. Appl. No. 11/344,458, 5 pages.
USPTO Office Action, dated Jan. 25, 2012, regarding U.S. Appl. No. 12/623,942, 17 pages.
USPTO Notice of Allowance, dated May 8, 2012, regarding U.S. Appl. No. 12/623,942, 8 pages.
PCT Search Report dated Oct. 16, 2006 application No. PCT/US2006/010825, 4 pages.
PCT Search Report dated Oct. 9, 2009 regarding 08-0625PCT, applicant The Boeing Company, application No. PCT/US2009/060245, 5 pages.
USPTO Office Action dated May 28, 2008 for U.S. Appl. No. 11/105,104, 14 pages.
Response to Office Action dated Sep. 19, 2008 for U.S. Appl. No. 11/105,104, 8 pages.
USPTO Notice of Allowance dated Jan. 7, 2009 for U.S. Appl. No. 11/105,104, 3 pages.
USPTO Notice of Allowance dated Feb. 12, 2009 for U.S. Appl. No. 11/105,104, 4 pages.
USPTO Requirement for Restriction dated Jun. 24, 2009 for U.S. Appl. No. 12/258,404, 6 pages.
Response to Requirement for Restriction dated Jul. 21, 2009 for U.S. Appl. No. 12/258,404, 18 pages.
USPTO Requirement for Restriction dated Oct. 21, 2009 for U.S. Appl. No. 12/258,404, 8 pages.
Response to Requirement for Restriction dated Nov. 16, 2009 for U.S. Appl. No. 12/258,404, 18 pages.
USPTO Office Action dated Mar. 9, 2010 for U.S. Appl. No. 12/258,404, 9 pages.
Response to Office Action dated Jun. 14, 2010 for U.S. Appl. No. 12/258,404, 26 pages.
USPTO Final Office Action dated Aug. 27, 2010 for U.S. Appl. No. 12/258,404, 10 pages.
Response to Final Office Action filed with a Request for Continued Examination dated Nov. 18, 2010 for U.S. Appl. No. 12/258,404, 21 pages.
USPTO Final Office Action dated Mar. 11, 2011 for U.S. Appl. No. 12/258,404, 8 pages.
Response to Final Office Action dated May 31, 2011 for U.S. Appl. No. 12/258,404, 26 pages.
USPTO Office Action dated Jul. 20, 2011 for U.S. Appl. No. 12/258,404, 6 pages.
Response to Office Action dated Oct. 25, 2011 for U.S. Appl. No. 12/258,404, 28 pages.
USPTO Final Office Action dated Jan. 17, 2012 for U.S. Appl. No. 12/258,404, 7 pages.
Office Action, dated Dec. 5, 2012, regarding USPTO U.S. Appl. No. 13/090,746, 38 pages.
Final Office Action, dated Feb. 20, 2013, regarding USPTO U.S. Appl. No. 12/576,759, 41 pages.
Final Office Action, dated May 15, 2013, regarding USPTO U.S. Appl. No. 13/090,746, 19 pages.
Notice of Allowance, dated Jun. 10, 2013, regarding USPTO U.S. Appl. No. 12/258,404, 38 pages.

METHOD FOR FORMING AND INSTALLING STRINGERS

TECHNICAL FIELD

This disclosure generally relates to techniques for fabricating composite structures such as those used in the aircraft industry, and deals more particularly with a method and apparatus for forming and installing composite stringers on a skin.

BACKGROUND

"Stiffeners" are used in the aircraft industry to reinforce or stiffen outer skins used on fuselage sections, wings, fins and similar structures. In some cases, the stiffeners, which may be stringers, are formed of composite materials and are attached to composite skins using structural adhesives that form bonded joints. Stringers may be relatively long in certain applications, such as wing structures, requiring that the stringers be precured in order to provide them with sufficient stiffness that allows them to be handled and placed in the desired position on the skin. These precured stringers are bonded to the skin, and in some cases, may require additional fastening using discrete fasteners.

The use of precured stringers requires cure tooling, vacuum bagging and autoclave operations which may increase the recurring cost associated with production of aircraft. Additionally, the use of structural adhesives to attach the stringers to the skin results in bonded joints which may present challenges in production, may add aircraft weight and in some cases, may be difficult to inspect.

Accordingly, there is a need for a method and apparatus for forming and installing stringers on a skin which reduce or eliminate the problems discussed above.

SUMMARY

The disclosed embodiments provide a method and apparatus for forming, placing and compacting stringers onto skins which allow relatively long stringers to be co-cured with the skin, resulting in a strong joint. In addition to producing a superior joint, the method and apparatus provide a hands-free stringer forming and placement operation that may decrease production time and may reduce or eliminate tooling and equipment normally required to form and precure the stringers.

According to one disclosed method embodiment, fabricating and installing a composite stringer on a skin comprises: using a tool assembly to form a composite charge into a preformed stringer; and, placing and compacting the preformed stringer on the skin using the tool assembly. Using the tool assembly to form the composite charge may include placing a composite charge on a first tool, and compressing the composite charge between the first tool and a second tool. Placing and compacting the preformed stringer on the skin may include holding the preformed stringer in a substantially fixed position on the tool assembly, and moving the tool assembly having the preformed stringer thereon into proximity with the skin. Compacting the preformed stringer may include using a portion of the tool assembly to force the preformed stringer against the skin. The method may further comprise vacuum bagging and co-curing skin and the compacted stringer.

According to another method embodiment, fabricating and installing a composite stringer on a skin of an aircraft comprises: placing a composite charge on a tool assembly; using the tool assembly to form the charge into a preformed stringer; using the tool assembly to position the preformed stringer on the skin; using the tool assembly to compact the preformed stringer against the skin; separating the tool assembly from the compacted stringer; vacuum bagging the compacted stringer and the skin; and, co-curing the stringer and the skin. The method may further comprise holding the preformed stringer in a fixed position on the tool assembly, and moving the tool assembly having the preformed stringer held thereon into proximity with the skin. Compacting the preformed stringer against the skin may include displacing a first portion of the tool assembly toward the skin while holding a second portion of the tool assembly substantially stationary. Displacing the first portion of the tool assembly may be performed by expanding a bladder to react against the first and second portions of the tool assembly.

According to another disclosed embodiment, apparatus is provided for forming and placing a composite stringer on a skin, comprising: a tool assembly, including a tray and tooling on the tray for forming and holding a preformed stringer; means for moving the tool assembly and the preformed stringer into proximity with the skin and for placing the preformed stringer on the skin; and, means in the tool assembly for compacting the preformed stringer against the skin. The tooling may include a pair of tools, and the tool assembly may further include means for shiftably mounting the tools on the tray and allowing the tools to generally conform to the surface contour of the skin, and locking means for selectively locking the tools against movement on the tray while the preformed stringer is being moved into proximity with the skin.

The disclosed embodiments satisfy the need for a method and apparatus for forming and placing an uncured or partially cured stringer on a composite skin that is highly efficient and reduces the need for equipment, tooling and process operations.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
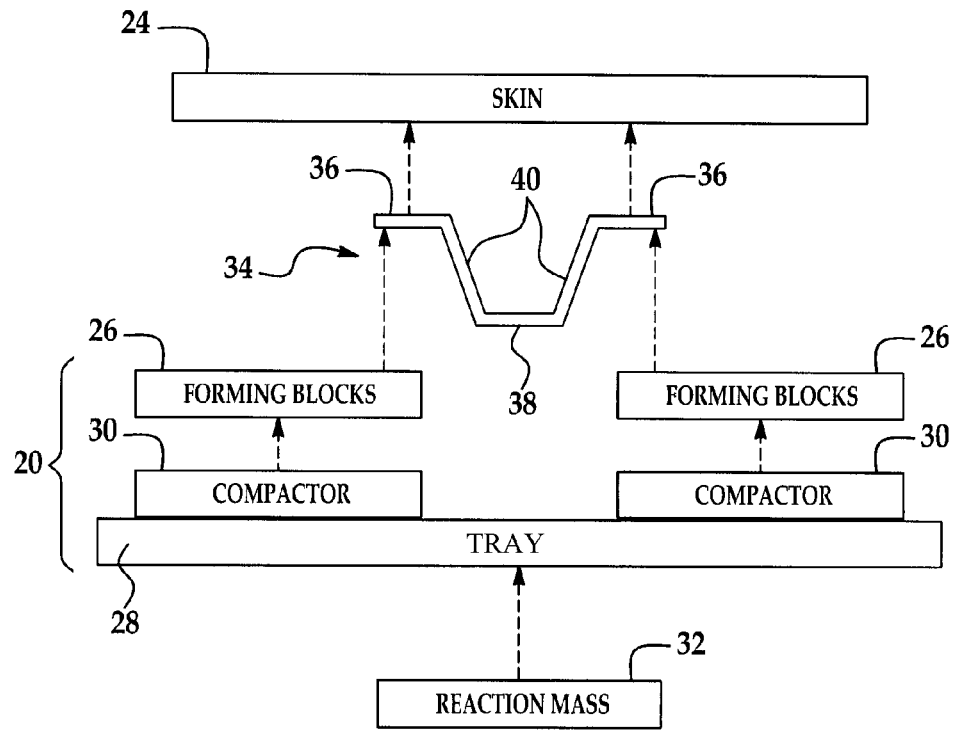
FIG. 1 is a functional block diagram of apparatus for forming and placing stringers on the skin of an aircraft.
Figure 2:
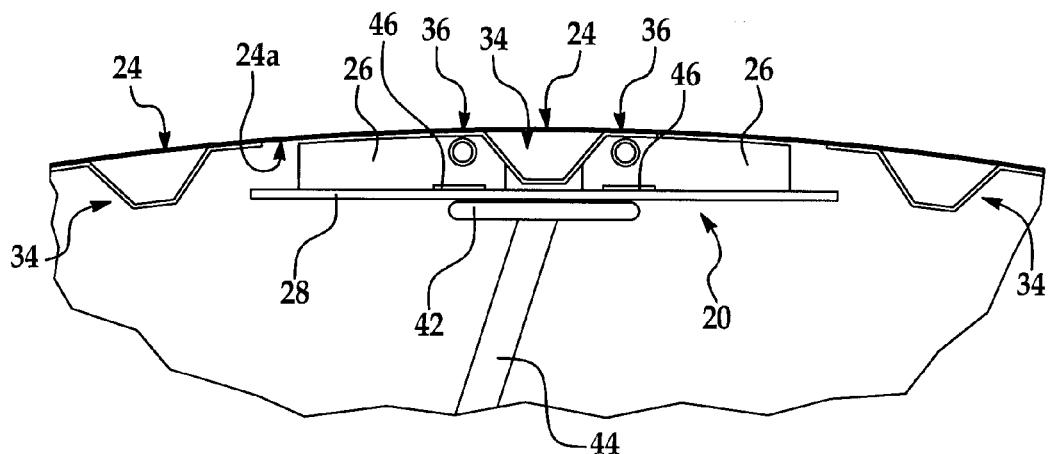
FIG. 2 is a sectional view showing the apparatus on a robotic arm in which a stringer has been placed on a skin.
Figure 3:
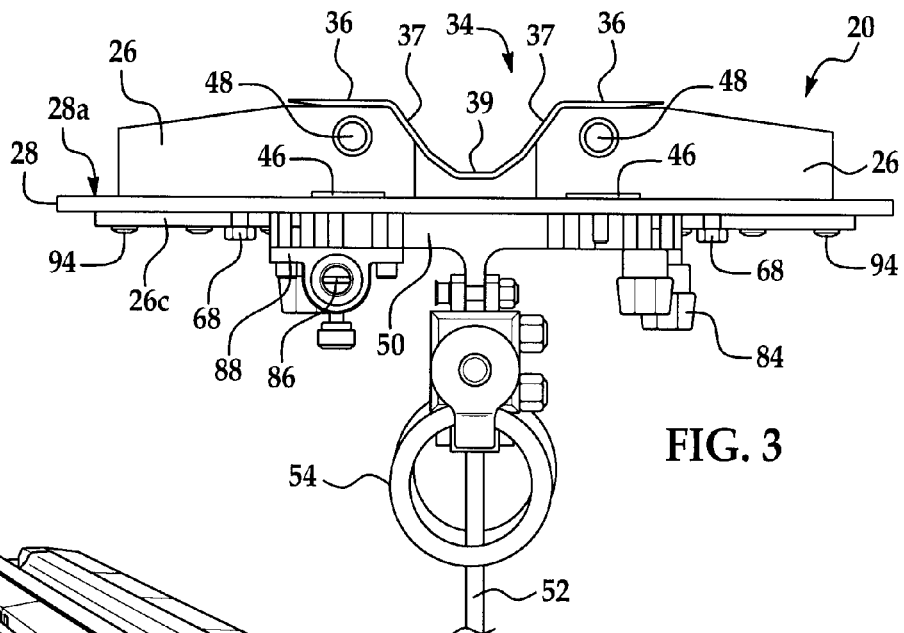
FIG. 3 is a sectional view of the apparatus mounted on an I-beam used to move the apparatus into proximity with the skin.
Figure 4:
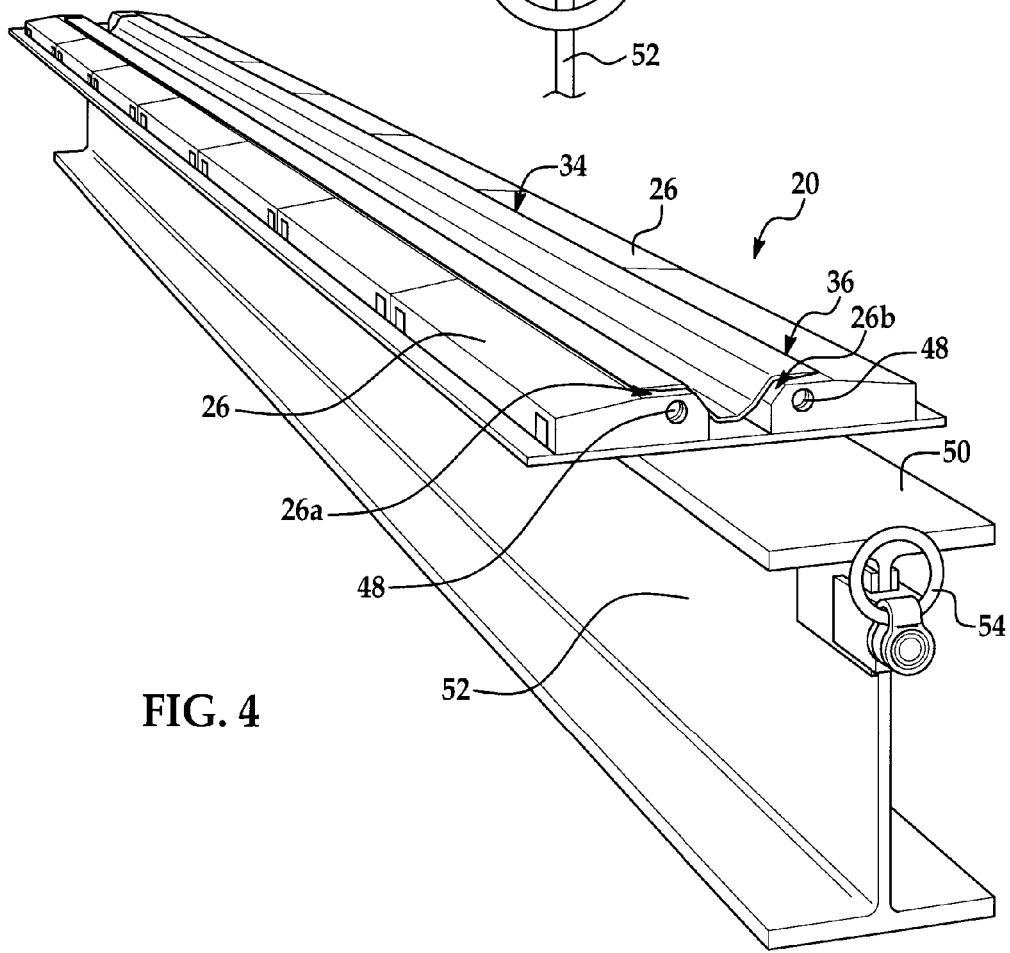
FIG. 4 is a perspective view of the apparatus shown mounted on the I-beam.

Referring to FIGS. 1 and 2, the disclosed embodiments generally relate to a method and apparatus for forming, placing and compacting an un-cured or partially cured composite stringer 34 on a surface 24a of a composite skin 24. Although the disclosed embodiments will be described in connection with stringers 34 installed on the skin 24 of an aircraft (not shown), it is to be understood that the embodiments may also be employed to place and compact stringers on other types of vehicles and structures, particularly where the stringers are relatively long and it is desired to co-cure the stringer 34 with the skin 24 in order to achieve a strong attachment therebetween.

The apparatus broadly includes a tool assembly 20 comprising a tray 28 upon which there is shiftably mounted a pair of forming blocks 26 that are displaceable by one or more compactors 30. As will be described below in more detail, the forming blocks 26 are used to shape the stringer 34, hold the stringer during the placement process and to transmit force uniformly over the stringer 34 during the compaction process. The tray 28 is mounted on a reaction mass 32 which, in the embodiment illustrated in FIG. 2 comprises a robotic arm 44 coupled with the tray 28 by a mounting head 42. The robotic arm 44 is used to move the tool assembly 20 into proximity with the skin 24 and to place the stringer 34 on a desired location of the skin 24. The compactors 30 function to displace the forming blocks 26 relative to the tray 28, toward the skin 24, causing the stringer 34 to be compacted against the skin 24. The force imposed on the forming blocks 26 by the compactor 30 is reacted by the reaction mass 32.

In the example illustrated in FIG. 2, the aircraft skin 24 is shown as possessing curvature, however the disclosed embodiments may be usefully employed in placing and compacting stringers on a flat skin, or other skin geometries. As will be discussed below, the tool assembly 20 may be employed to form, place and compact the stringer 34 in hands-free operations, in which the stringer 34 remains indexed on the tool assembly 20 until the tool assembly 20 is separated from the stringer 34 after the stringer has been placed and compacted.

Attention is now directed to FIGS. 3-7 which illustrate the tool assembly 20 mounted on a flange 50 of an I-beam 52 having lifting rings 54 that allow the tool assembly 20 to be transported during the stringer forming and placement operations. The disclosed embodiments will be described in connection with the forming, placement and compaction of a hat-shaped stringer 34, however, it should be noted that the hat-shaped stringer 34 is merely an example of a wide range of stringer shapes that may be formed, placed and compacted using the disclosed embodiments. The hat-shaped stringer 34 comprises a pair of flanges 36 forming a "brim" connected to a top 39 by inclined sides 37. Each of the forming blocks 26 includes an upper flat tooling surface 26a used to shape the flanges 36, and a beveled tooling surface 26b used in shaping the sides 37 of the stringer 34.

Figure 6:
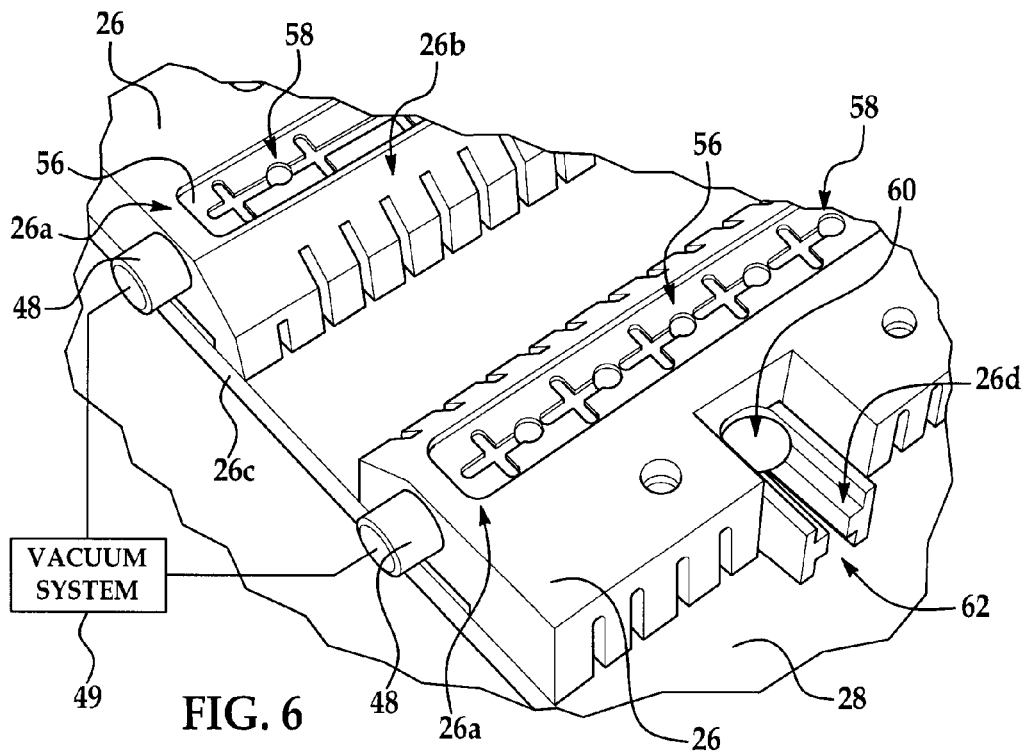
FIG. 6 is a perspective view illustrating details of the forming blocks forming part of the apparatus shown in FIG. 3.
Figure 13:
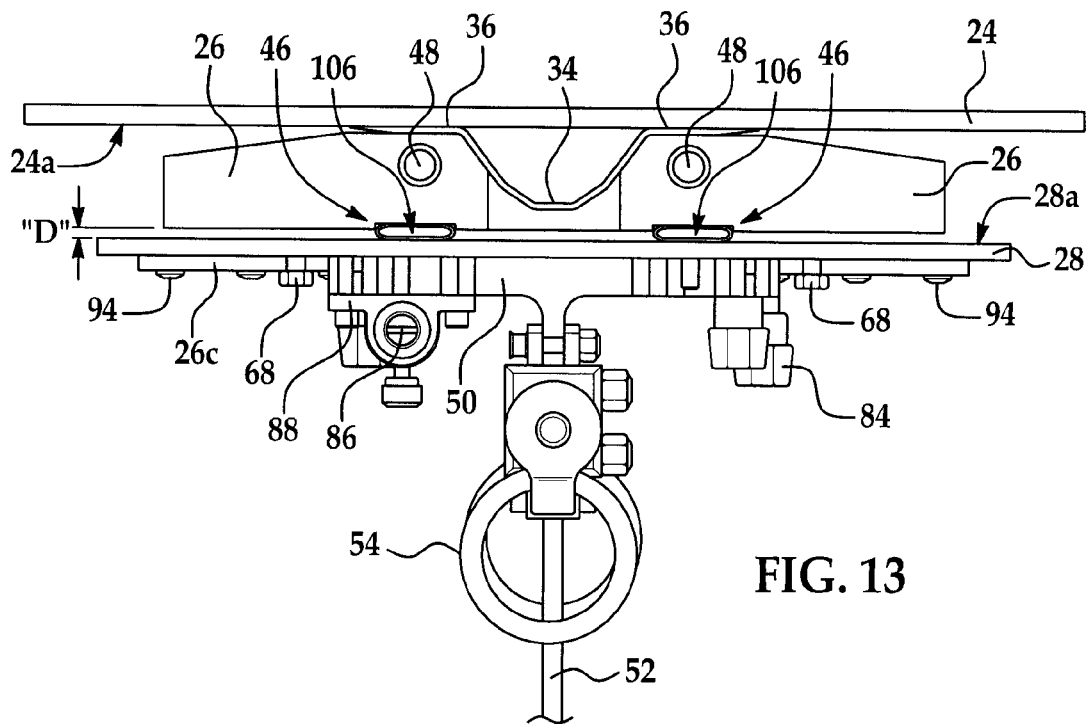
FIG. 13 is a sectional view of the tool assembly illustrating the use of an inflatable bladder to compact the preformed stringer against the skin, a mandrel and noodle not being shown for purposes of clarity.

In one embodiment, as shown in FIG. 6, each of the forming blocks 26 includes a recessed channel 56 within the tooling surface 26a which includes passageways 58 connected to a vacuum system 49 via a coupling 48. The vacuum system 49 evacuates air in the passageways 58 which reduces the air pressure beneath the flanges 37, drawing the flanges 37 down tightly against the forming blocks 26. The bottom face 26c of each of the forming blocks 26 includes a longitudinally extending channel 46 therein containing a compactor 30 which, in the illustrated example, comprises a later discussed bladder 106 (FIG. 13). The forming blocks 26 are shiftably mounted on the upper surface 28a of the tray 28. As used herein, "tray" 28 refers to a suitable supporting surface on which the forming blocks 26 may be mounted, and while the tray 28 is illustrated as comprising a flat plate, other geometries are possible. The tray 28 is fixed to the I-beam 52 by any suitable means, such as and without limitation, screws 94.

Figure 7A:
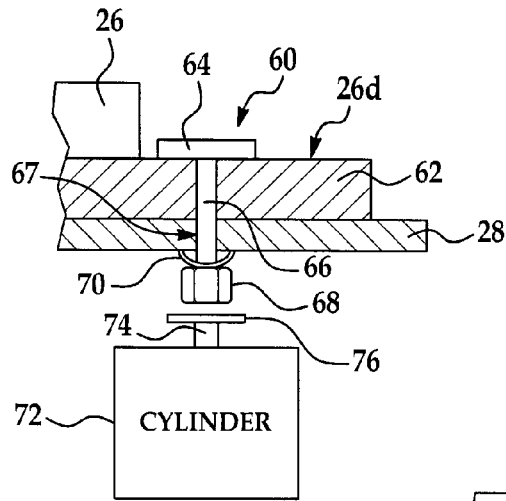
FIGS. 7a and 7b are sectional views illustrating locking means for selectively locking the forming blocks against movement.
Figure 7B:
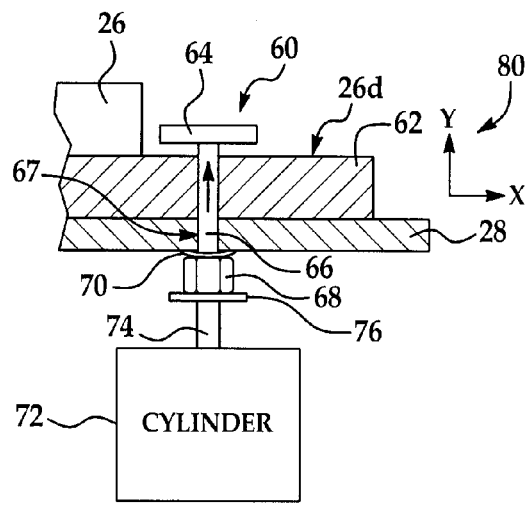

As shown in FIG. 6, each of the forming blocks 26 includes a guide slot 62 therein which receives a spring loaded T-nut 60 (FIGS. 7a and 7b). The T-nut 60 includes a head 64 which bears on the upper surface of a portion 26d of the forming block 26 surrounding the slot 62. As shown in FIGS. 7a and 7b, the head 64 is connected with a nut 68 by a shaft 66 that extends through the slot 62 and passes through an opening 67 in the tray 28. A spring washer 70 captured between the nut 68 and the tray 28 normally biases the T-nut 60 downwardly, causing the head 64 to bare against the forming block 26, thereby locking the latter against movement. However, an upward force applied to the nut 68 overcomes the bias force of the spring washer 70 forcing the head 64 upwardly to create a gap 78 (FIG. 7b), thereby unlocking the forming blocks 26 for movement in both X and Y directions 80. Thus, as best seen in FIG. 13, the forming blocks 26 may slide and tilt, as required, when the flanges 36 of the stringer 34 engage the skin 24 so that the forming blocks 26 conform to the surface contour of the skin 24a in order to accommodate ramps, pad-ups or other uneven surface features of the skin 24.

Displacement of the T-nuts 60 to unlock the forming blocks 26 may be performed either manually, or automatically using, for example, a hydraulic or pneumatic cylinder 72 having an output shaft 74 with a pusher 76 that engages the bottom of the nut 68. When the cylinder 72 is actuated, displacement of the shaft 74 results in the pusher 76 contacting the nut 68 and displacement of the entire T-nut 60 upwardly until the head 64 clears the surface of the forming block 26, thereby releasing the forming block 26 for movement.

During movement of the tool assembly 20, as when the stringer 34 is being placed on the skin 24, it is desirable that the preformed stringer 34 remain in a fixed, constantly indexed position, held against the forming blocks 26. Depending upon the amount of vacuum force applied to the flanges 37 by the vacuum system 49 (FIG. 6), in some applications the stringer 34 may be held in the fixed position against the blocks 26 by means of the force of this vacuum force.

Referring now particularly to FIGS. 3, 5, 10 and 11, in order to assure that the un-cured or partially cured, preformed stringer 34 retains its shape during the placement and compaction process, a flexible, semi-flexible or rigid mandrel 104 (FIGS. 10 and 11) is placed within the stringer 34, between the forming blocks 26. Depending upon the particular shape of the stringer 34, filler noodles 108 may also be installed in radius areas defined between the mandrel 104 flanges 36 and side walls 37.

Figure 5:
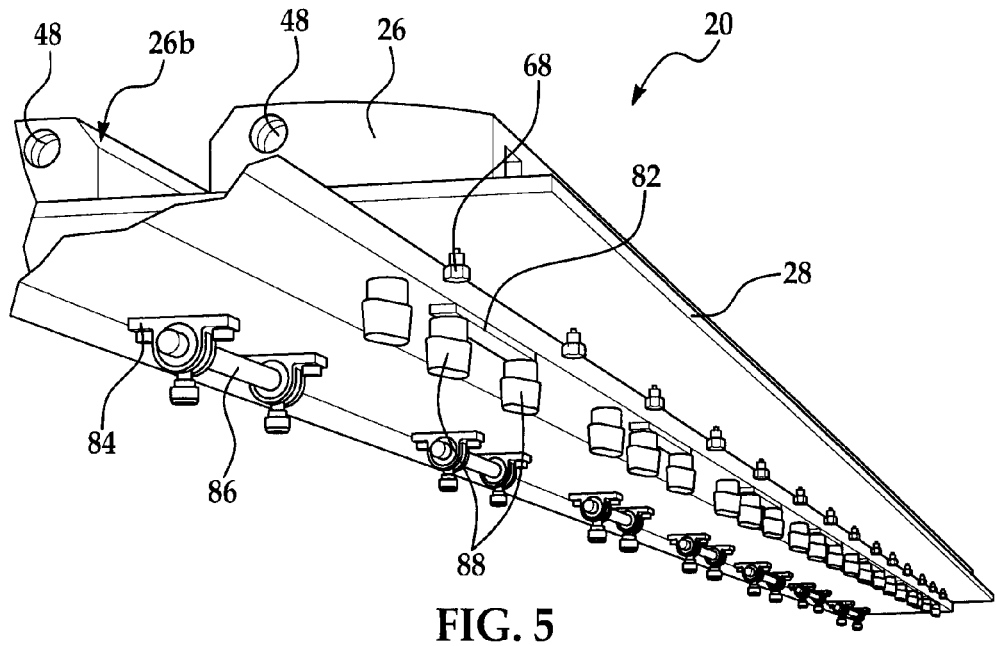
FIG. 5 is a perspective view showing the bottom of the tool assembly.
Figure 10:
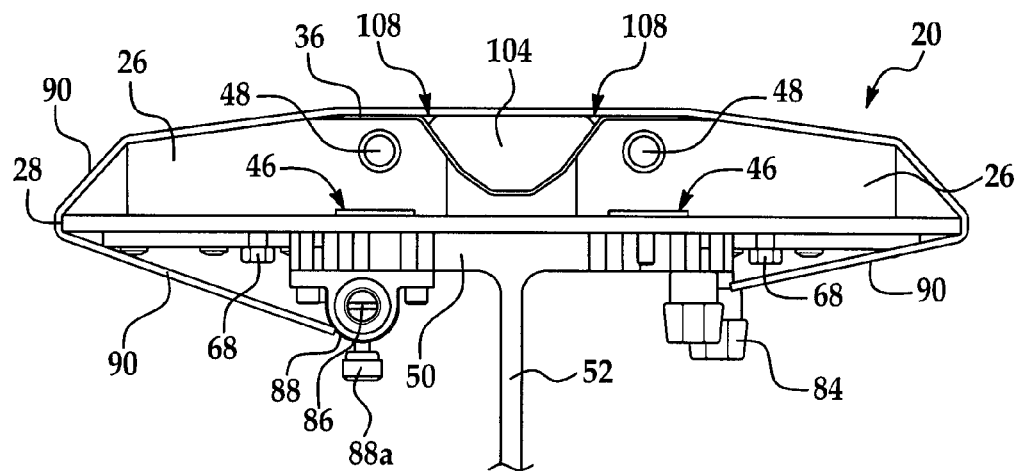
FIG. 10 is a view similar to FIG. 3, but showing a mandrel, filler noodles and hold-down straps having been installed in preparation for placing the preformed stringer on a skin.
Figure 11:
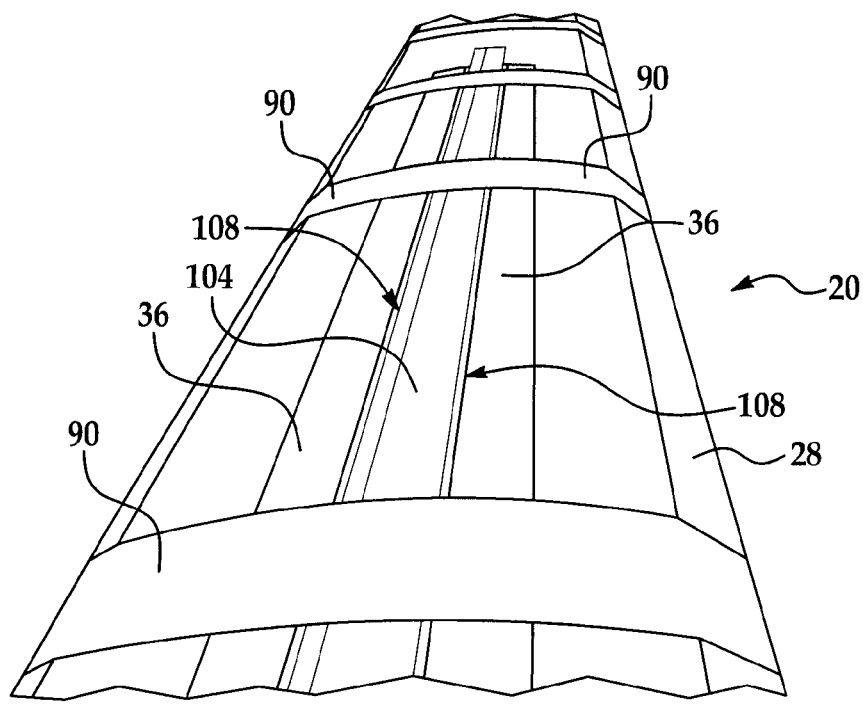
FIG. 11 is a perspective view showing the top of the tool assembly, and better illustrating the assembled mandrel, noodles and tie down straps.

In order to hold the mandrel 104 and noodles 108 in place during the placement and compaction process, a plurality of hold down straps 90 are trained around the entire tool assembly 20, at spaced locations along the length of the tool assembly 20 as can be seen in FIG. 11. As shown in FIGS. 5 and 10, one end of each of the straps 90 may be fixed to the bottom of the tray 28 by any suitable means, as shown by means of a hold down plate 82 secured by screws 84. The opposite end of each of the straps 90 may be trained around a shaft 86 rotatably mounted on pillow block bearings 86 secured to the bottom face of the tray 28. The pillow block bearings 88 may include a ratchet device (not shown) which allow the shaft 86 to be ratcheted in order to tighten the straps 90 to the desired tension. Various other devices or structures (not shown) could be employed to hold together the assembly of the stringer 36, noodles 108 and mandrel 104.

Figure 8:
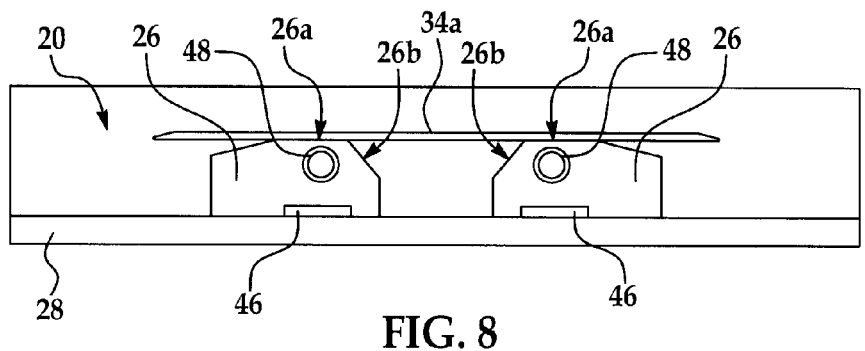
FIG. 8 is an end view of the tool assembly showing a flat composite charge having been placed thereon.

FIG. 8 illustrates a preliminary step in the method for forming, placing and compacting the stringers 34. A flat charge 34a comprising multiple plies or layers of an uncured or partially cured (prepreg) composite material is placed on top of the forming blocks 26, substantially centered therebetween. The flat charge 34a may be formed by placing successive layers of the prepreg on the forming blocks 26, or may be formed into a complete charge which is subsequently placed on the forming blocks 26. Depending upon the application, the charge 34a may comprise any of various, well known material combinations such as, by way of example and not limitation, graphite fibers held in an epoxy resin matrix.

Figure 9:
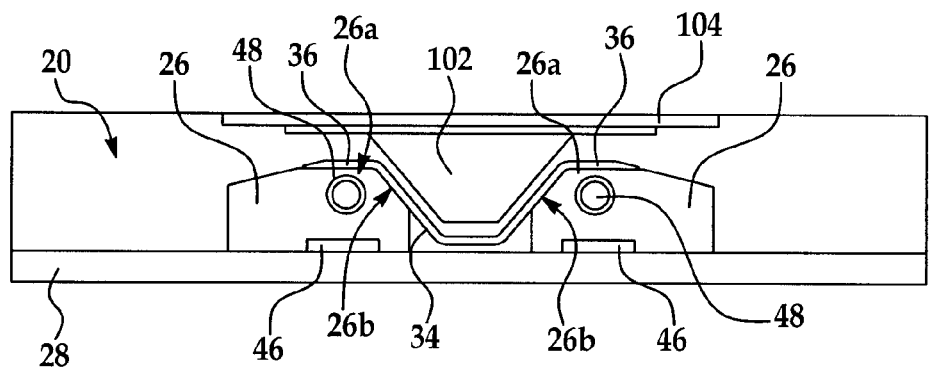
FIG. 9 is a view similar to FIG. 8, but also showing a male tool and the flat charge having been formed into a preformed stringer.

The charge 34a will normally be placed on the forming blocks 26 after the tool assembly 20 has been positioned at a forming station where other tools are present that are used in forming the charge 34a to its final shape. For example, as shown in FIG. 9, after the charge 34a has been placed on the forming blocks 26, a male tool 102 having a shape conforming to the inner mold line of the stringer 36 is driven by a platen 104 down through the charge 34a, thereby pressing the charge 34a between the tool 102 and the previously mentioned tool surfaces 26a, 26b (see FIG. 6) on the forming blocks 26. This shaping process converts the flat charge 34a into an uncured or partially cured preformed stringer 36.

Figure 12:
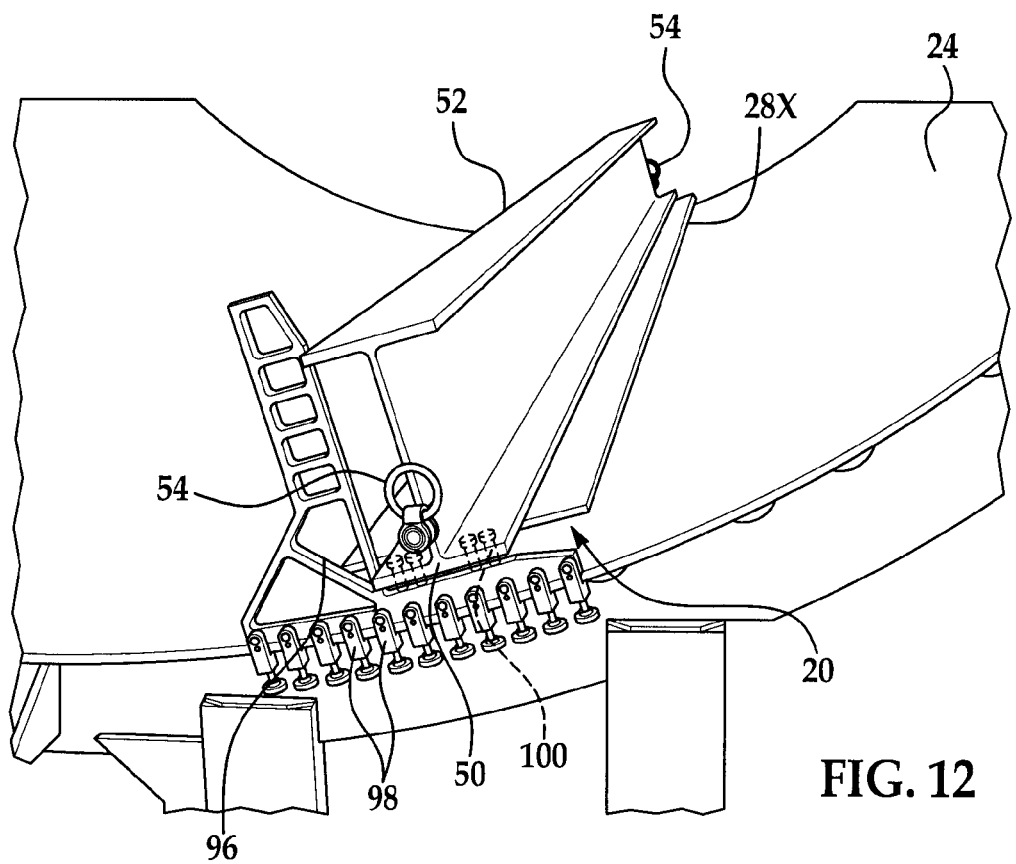
FIG. 12 is a perspective view showing the tool assembly having been placed and locked down onto a skin using an I-beam.

The stringer 36 having been preformed, the rigid or flexible mandrel 104 is then installed along with the noodles 106, following which the hold down straps 90 are installed, as shown in FIGS. 10 and 11. The tool assembly 20 is then moved into proximity with the skin 24 by lifting and moving the I-beam 52. Using I-beam 52, the tool assembly 20 is positioned such that the preformed stringer 34 is placed at the desired location on the skin 24, as shown in FIG. 12. In some applications, the weight of the I-beam 52 may be sufficient to allow it to function as a reaction mass 32 (FIG. 1) while in other applications it may be necessary to temporarily hold down the I-beam 52 using any of various mechanisms. In the illustrated example, the I-beam 52 is held in a fixed position by means of a fixture 96 attached to the edge of the skin 24 by screws 98. The I-beam 52 in turn is secured by screws 100 to the fixture 96, thus the skin 24 itself is used to react against the forces generated by the compactor 30 during the compaction process.

Referring to FIG. 13, once the tool assembly 20 is brought into proximity with the skin 24, the stringer 36 is positioned over and contacts the surface 24a of the skin 24. In FIG. 13, the mandrel 104 and noodles 108 have not been shown in order to simplify the drawing. With the I-beam 50, and thus the tray 28, held in a fixed position, the previously described T-nuts 60 shown in FIGS. 6, 7a and 7b are released, freeing the forming blocks 26 to move, and the bladders 106 are then inflated. The inflation of the bladders 106 results in the displacement of the forming blocks 26 toward the skin 24 by a distance "D", in turn compacting the flanges 36 against the skin 24. The blocks 26 are held in the position just described for a preselected length of time to both complete the compaction process and cause the flanges 36 to adhere to the skin 24. This adhesion is made possible by the "stickiness" of uncured resin present in both the preformed stringer 34 and the skin 24. In some applications, it may be desirable to heat the stringer 36 in order to soften the resin which will enhance its stickiness and thereby improve its adhesion to the skin 24 in combination with the compaction.

Figure 14:
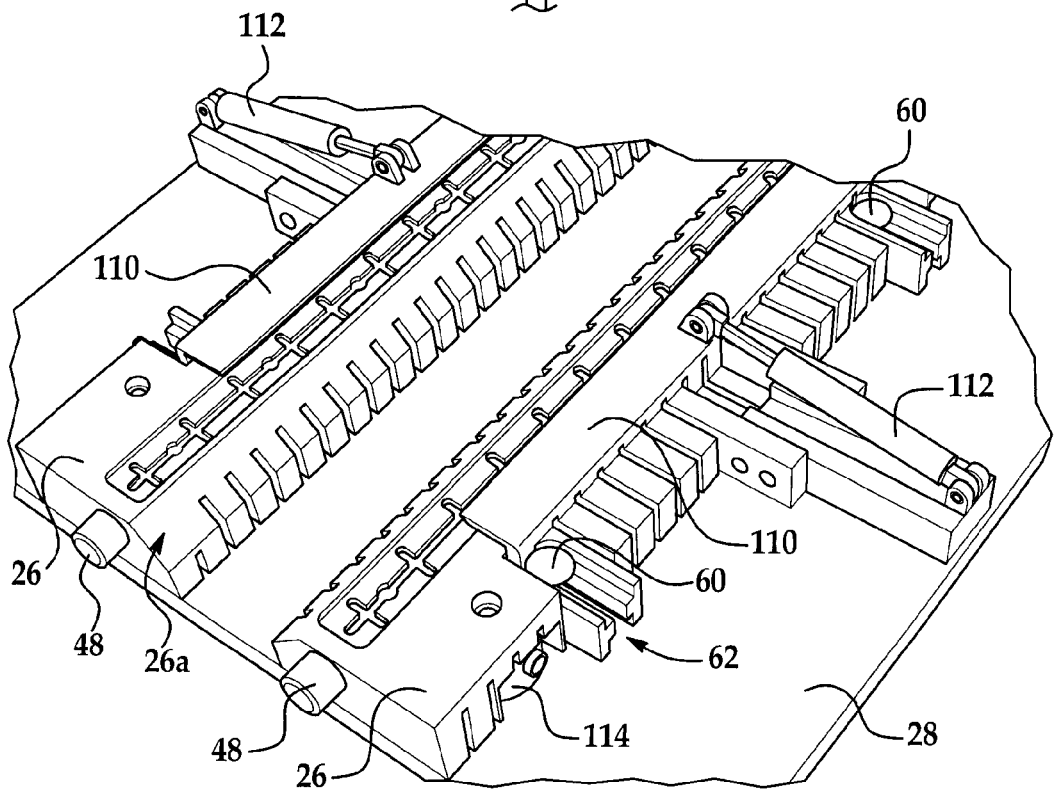
FIG. 14 is a perspective view showing an alternate technique for clamping the stringer on the forming blocks and for locking the forming blocks in place.
Figure 15:
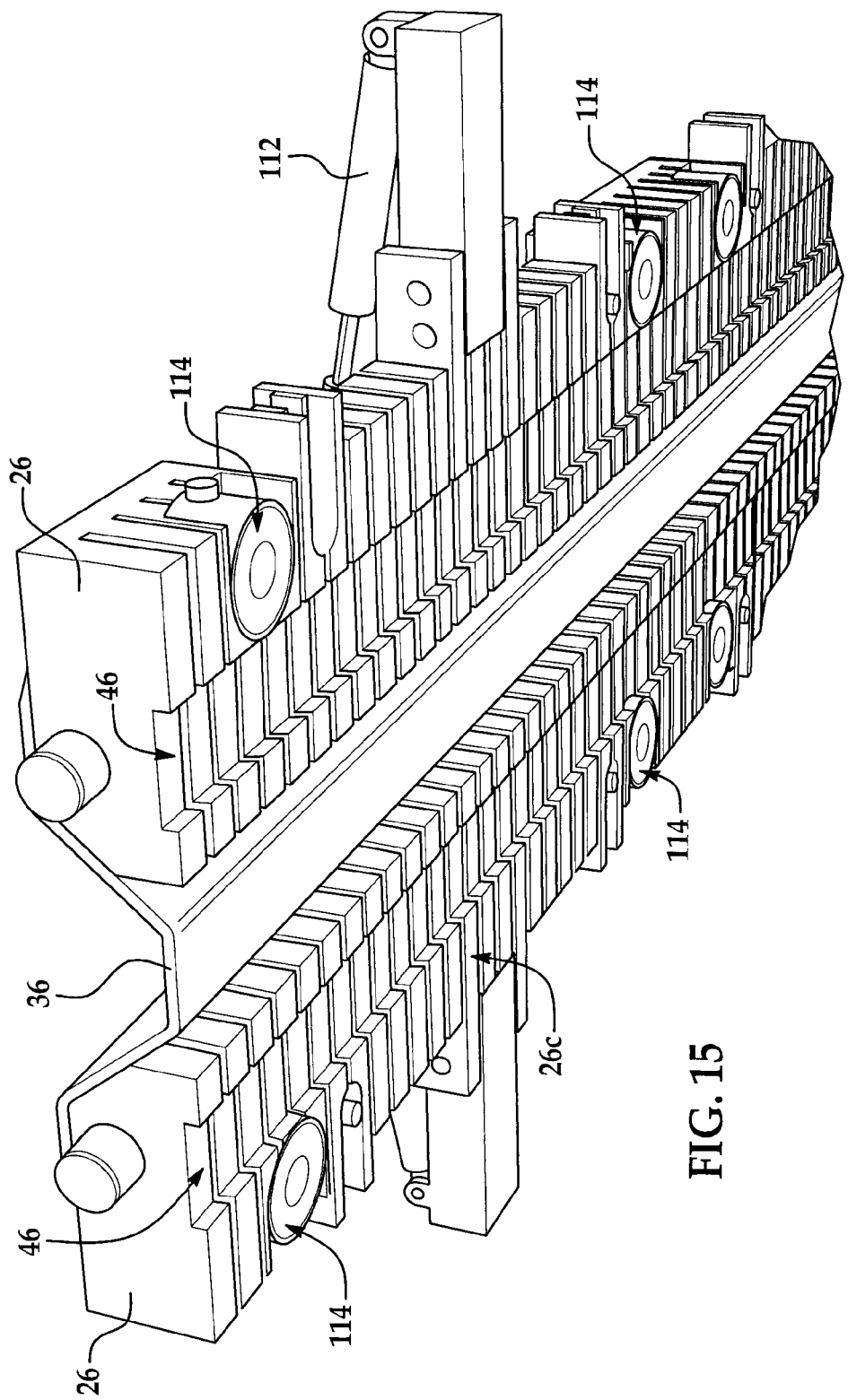
FIG. 15 is a bottom view of the forming blocks shown in FIG. 14, the tray having been removed to better illustrate magnets.

A number of variations in features of the apparatus are possible. For example, as shown in FIGS. 14 and 15, instead of using the hold down straps 90 it may be possible, in some applications to employ edge hold downs 110 operated by fluid cylinders 112 which releasably hold down the edges of the flanges 36 on the tool surfaces 26a. Similarly, in lieu of the use of the previously described T-nuts 60 for selectively locking down the forming blocks 26 on the tray 28, it may be possible to employ electrically energizable magnets 114 that are disposed between the forming blocks 26 and the tray 28. When the magnets 114 are energized, the forming blocks 26 are locked in place on the tray 28, however when the magnets are de-energized, the forming blocks 26 are released for movement relative to the tray 28.

Figure 16:
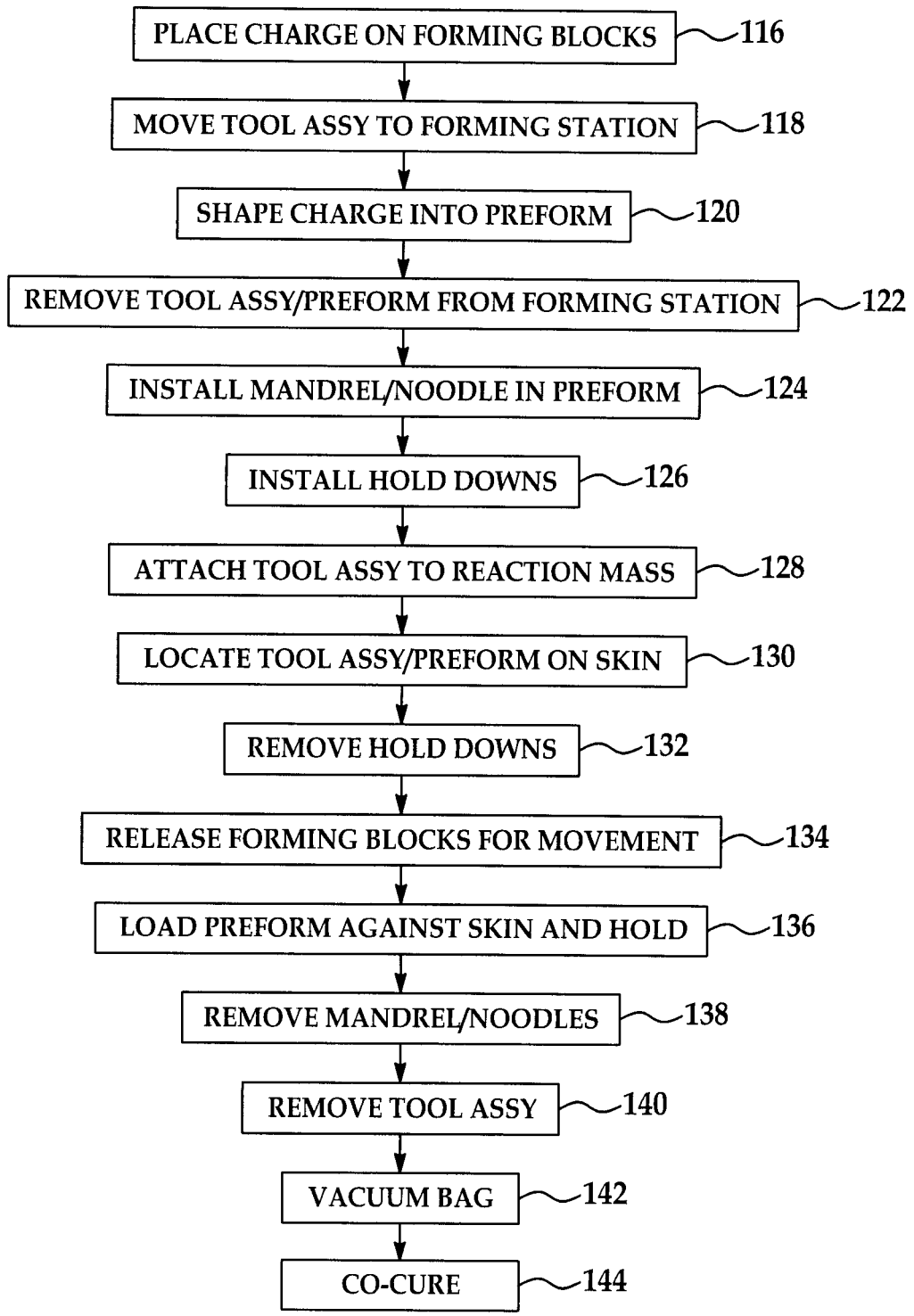
FIG. 16 is a flow diagram illustrating a method for forming and installing stringers on a skin.

Attention is now directed to FIG. 16 which shows, in simplified form, the steps of a method for forming, placing and compacting the stringers 34 on the skin 24. Beginning at 116, a generally flat composite charge 34a is placed on the forming blocks 26. Then, at 118, the tool assembly 20 is moved to a forming station where, as shown in FIG. 9, a tool 102 is used in combination with the forming blocks 26 to form the stringer 34 into a preform shape as indicated by the step 120. Next at 122, the tool assembly 20 and the preformed stringer 34 are removed from the forming station. Then, at 124, the rigid or flexible mandrel 104 and noodles 108 are installed, following which, at 126, the hold down straps 90 are installed. If the tool assembly 20 has not already been mounted on a reaction mass 32 (FIG. 1) then the tool assembly 20 is mounted on a structure such as the I-beam 52 or a robotic arm 44 (FIG. 2), however this step may precede earlier steps, if desired.

Next, as shown at 130, the tool assembly 20 having the preformed stringer 34 held thereon is moved into proximity with the skin 24 and the preform stringer 34 is placed on the skin 24. Then, the hold down straps 90 are removed at 132. At this point, the forming blocks 26 may be released for movement as shown at 134, allowing them to conform to the contour of the skin 24. At 136, the bladders 106 are inflated which displace the forming blocks 26 to load the preform stringer 34 against the skin 24. The loading of the preformed stringer 34 compacts the stringer 34 against the skin 24, causing the stringer to adhere to the skin 24 at the placement position. The stringer 34 is held against the skin 24 for a preselected period of time, following the mandrel 104 and noodles 108 may be removed at 138 and the entire tool assembly 20 is removed or separated from the stringer 34, as shown at step 140. Next, at 142, the entire skin 24 having the stringer 34 placed and compacted thereon is vacuum bagged at 142, and then co-cured at 144.

Figure 17:
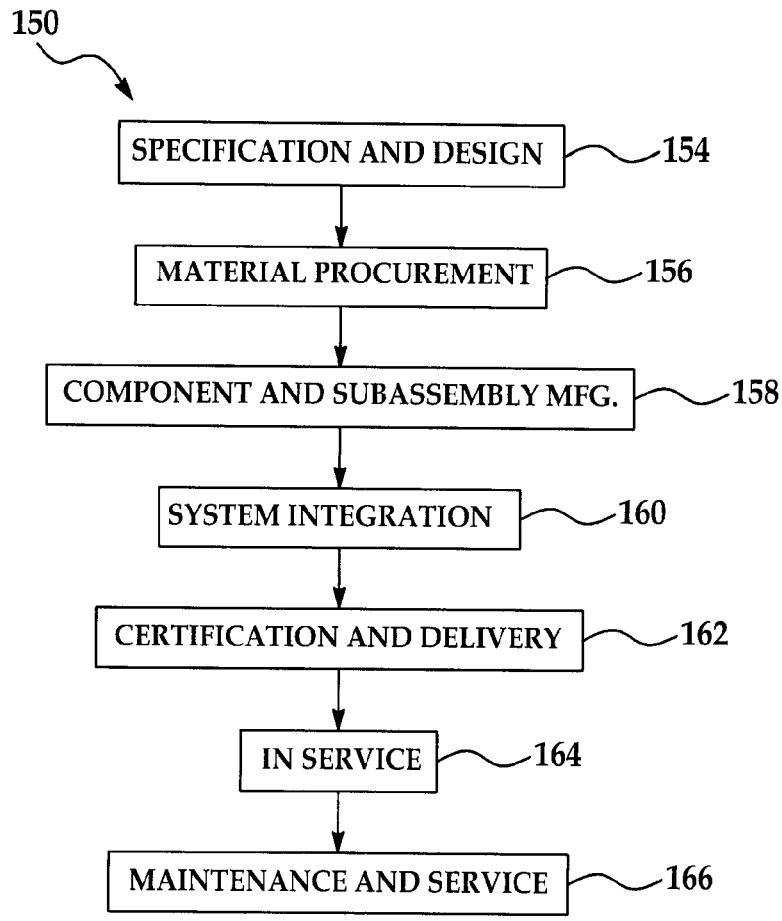
FIG. 17 is a flow diagram of aircraft production and service methodology.
Figure 18:
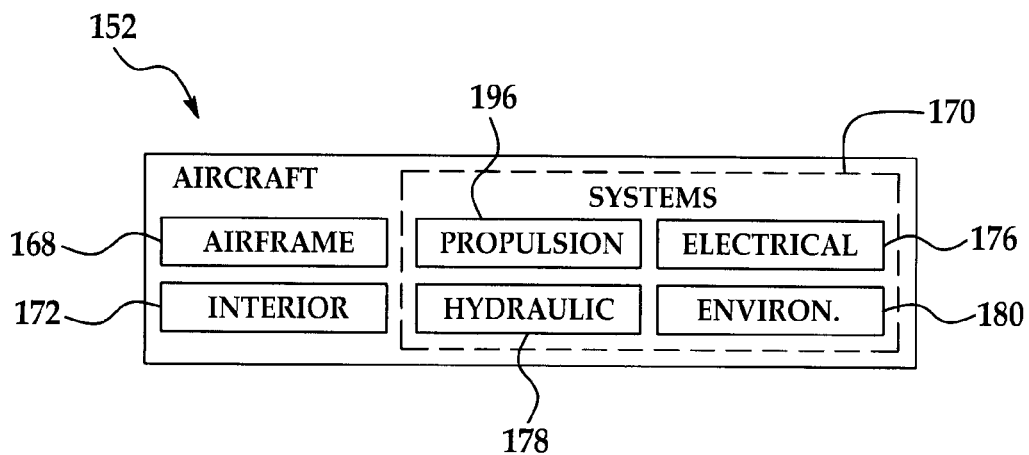
FIG. 18 is a block diagram of an aircraft.

Embodiments of the disclosure may find use in a variety of potential applications, particularly in the transportation industry, including for example, aerospace, marine and automotive applications. Thus, referring now to FIGS. 17 and 18, embodiments of the disclosure may be used in the context of an aircraft manufacturing and service method 150 as shown in FIG. 17 and an aircraft 152 as shown in FIG. 18. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 150 may include specification and design 154 of the aircraft 152 and material procurement 156. During production, component and subassembly manufacturing 98 and system integration 160 of the aircraft 152 takes place. Thereafter, the aircraft 152 may go through certification and delivery 162 in order to be placed in service 164. While in service by a customer, the aircraft 152 is scheduled for routine maintenance and service 166 (which may also include modification, reconfiguration, refurbishment, and so on).

Each of the processes of method 150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 152 produced by exemplary method 150 may include an airframe 108 with a plurality of systems 170 and an interior 172. Examples of high-level systems 170 include one or more of a propulsion system 174, an electrical system 170, a hydraulic system 178, and an environmental system 180. Any number of other systems may be included. Although an aerospace example is shown, the principles of the disclosure may be applied to other industries, such as the marine and automotive industries.

Systems and methods embodied herein may be employed during any one or more of the stages of the production and service method 150. For example, components or subassemblies corresponding to production process 158 may be fabricated or manufactured in a manner similar to components or subassemblies produced while the aircraft 152 is in service. Also, one or more apparatus embodiments, method embodiments, or a combination thereof may be utilized during the production stages 158 and 160, for example, by substantially expediting assembly of or reducing the cost of an aircraft 152. Similarly, one or more of apparatus embodiments, method embodiments, or a combination thereof may be utilized while the aircraft 152 is in service, for example and without limitation, to maintenance and service 166.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating and installing a composite stringer on a skin, comprising:
   using a tool assembly to form a composite charge into a preformed stringer;
   placing the preformed stringer on the skin using the tool assembly;
   displacing a first portion of the tool assembly toward the skin while holding a second portion of the tool assembly substantially stationary;
   placing a mandrel in the preformed stringer; and
   holding the mandrel in the preformed stringer while the tool assembly is moved into proximity with the skin.

2. The method of claim 1, wherein using the tool assembly to form the composite charge into the preformed stringer includes pressing a composite charge between first and second tools.

3. The method of claim 1, wherein placing the preformed stringer on the skin using the tool assembly includes:
   holding the preformed stringer in a substantially fixed position on the tool assembly, and
   moving the tool assembly having the preformed stringer thereon into proximity with the skin.

4. The method of claim 3, further comprising:
   compacting the preformed stringer by using a portion of the tool assembly to force the preformed stringer against the skin.

5. The method of claim 3, further comprising:
   compacting the preformed stringer;
   releasing the preformed stringer from the tool assembly after the preformed stringer has been compacted; and,
   moving the tool assembly away from the preformed stringer after the preformed stringer has been released.

6. The method of claim 3, wherein holding the preformed stringer in a substantially fixed position on the tool assembly includes installing a stringer hold down on the tool assembly before the tool assembly is moved into proximity with the skin, and the method further comprises:
   removing the stringer hold down after the preformed stringer has been placed on the skin.

7. The method of claim 1, further comprising
   compacting the preformed stringer against the skin;
   vacuum bagging the skin and the preformed, compacted stringer; and,
   co-curing the skin and the preformed, compacted stringer.

8. A method of fabricating and installing a composite stringer on a skin of an aircraft, comprising:
   placing a composite charge on a tool assembly;
   using the tool assembly to form the charge into a preformed stringer;
   placing a mandrel in the preformed stringer;
   using the tool assembly to position the preformed stringer on the skin;
   holding the mandrel in the preformed stringer while the tool assembly is moved into proximity with the skin;
   using the tool assembly to compact the preformed stringer against the skin;
   displacing a first portion of the tool assembly toward the skin while holding a second portion of the tool assembly substantially stationary;
   separating the tool assembly from the compacted stringer;
   vacuum bagging the compacted stringer and the skin; and,
   co-curing the stringer and the skin.

9. The method of claim 8, wherein using the tool assembly to form the charge includes compressing the charge between male and female tools.

10. The method of claim 8, further comprising:
    holding the preformed stringer in a fixed position on the tool assembly; and,
    moving the tool assembly having the preformed stringer held thereon into proximity with the skin.

11. The method of claim 10, wherein holding the preformed stringer on the tool assembly includes wrapping straps around the preformed stringer and the tool assembly, and the method further comprises:

removing the straps after the preformed stringer has been positioned on the skin.

12. The method of claim 8, wherein displacing the first portion of the tool assembly includes expanding a bladder to react against the first and second portions of the tool assembly.

13. The method of claim 8, wherein using the tool assembly to position the preformed stringer on the skin includes:

forcing the preformed stringer into contact with the skin by displacing tools on the tool assembly and allowing the displaced tools to conform to the shape of the skin.

14. A method of fabricating and installing a composite stringer on a skin of an aircraft, comprising:

placing a flat composite charge on a tool assembly;

moving the tool assembly to a forming station;

shaping the flat charge into a preformed stringer at the forming station by compressing the flat charge between the tool assembly and a tool at the forming station;

clamping the preformed stringer on the tool assembly;

moving the tool assembly and preformed stringer into proximity with the skin;

using the tool assembly to place the preformed stringer onto the skin;

compacting the preformed stringer against the skin by displacing the tool assembly toward the skin;

displacing a first portion of the tool assembly toward the skin while holding a second portion of the tool assembly substantially stationary, the displacing including expanding a bladder between the first and second portions of the tool assembly to react against the first and second portions of the tool assembly to contour the first portion to the skin via the bladder;

removing the tool assembly from the compacted stringer;

vacuum bagging the compacted stringer and the skin; and co-curing the compacted stringer and the skin.

15. A method of fabricating and installing a composite stringer on a skin, comprising:

using a tool assembly to form a composite charge into a preformed stringer;

placing the preformed stringer on the skin using the tool assembly; and displacing a first portion of the tool assembly toward the skin while holding a second portion of the tool assembly substantially stationary, the displacing including expanding a bladder between the first and second portions of the tool assembly to react against the first and second portions of the tool assembly to contour the first portion to the skin via the bladder.

* * * * *